US009822289B2

(12) United States Patent
Roock et al.

(10) Patent No.: US 9,822,289 B2
(45) Date of Patent: Nov. 21, 2017

(54) TWO COMPONENT POLYURETHANE COMPOSITION

(71) Applicant: SIKA TECHNOLOGY AG, Baar (CH)

(72) Inventors: Wolfgang Roock, Appen (DE); Steffen Kelch, Oberengstringen (CH); Andrea Thomas, Bokholt-Hanredder (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/891,240

(22) PCT Filed: May 14, 2014

(86) PCT No.: PCT/EP2014/059875
§ 371 (c)(1),
(2) Date: Nov. 13, 2015

(87) PCT Pub. No.: WO2014/184257
PCT Pub. Date: Nov. 20, 2014

(65) Prior Publication Data
US 2016/0090515 A1    Mar. 31, 2016

(30) Foreign Application Priority Data

May 15, 2013   (EP) .................................... 13167914

(51) Int. Cl.
| | | |
|---|---|---|
| *C09J 175/08* | (2006.01) | |
| *C08G 18/69* | (2006.01) | |
| *B32B 37/12* | (2006.01) | |
| *C09J 5/00* | (2006.01) | |
| *C09J 175/12* | (2006.01) | |
| *B32B 7/12* | (2006.01) | |
| *C08G 18/76* | (2006.01) | |
| *C08G 18/66* | (2006.01) | |
| *C08G 18/48* | (2006.01) | |
| *C08G 18/50* | (2006.01) | |
| *C08G 18/32* | (2006.01) | |
| *C09J 175/04* | (2006.01) | |

(52) U.S. Cl.
CPC .............. *C09J 175/08* (2013.01); *B32B 7/12* (2013.01); *B32B 37/12* (2013.01); *C08G 18/3206* (2013.01); *C08G 18/482* (2013.01); *C08G 18/4812* (2013.01); *C08G 18/4829* (2013.01); *C08G 18/4879* (2013.01); *C08G 18/5021* (2013.01); *C08G 18/6674* (2013.01); *C08G 18/69* (2013.01); *C08G 18/698* (2013.01); *C08G 18/7671* (2013.01); *C09J 5/00* (2013.01); *C09J 175/04* (2013.01); *C09J 175/12* (2013.01); *C09J 2475/00* (2013.01)

(58) Field of Classification Search
CPC ............ C08G 18/3206; C08G 18/4812; C08G 18/482; C08G 18/4829; C08G 18/4879; C08G 18/5021; C08G 18/6674; C08G 18/69; C08G 18/698; C08G 18/7671; C09J 175/04; C09J 175/08; C09J 175/12; C09J 2475/00; C09J 5/00; B32B 37/12; B32B 7/12
USPC ........................... 428/423.1; 528/65; 156/60
See application file for complete search history.

(56) References Cited

U.S. PATENT DOCUMENTS

| | | | |
|---|---|---|---|
| 2009/0035506 A1* | 2/2009 | Pind | .................. C08G 18/3215 428/73 |
| 2009/0214873 A1 | 8/2009 | Demmig | |
| 2010/0255314 A1* | 10/2010 | Burckhardt | .......... C07C 251/08 428/414 |
| 2013/0288060 A1 | 10/2013 | Pind et al. | |

FOREIGN PATENT DOCUMENTS

| | | | |
|---|---|---|---|
| CN | 101151290 | | 3/2008 |
| CN | 102272184 | A | 12/2011 |
| EP | 1 690 880 | A1 | 8/2006 |
| EP | 2352775 | A1 | 8/2011 |
| EP | 2 468 789 | A1 | 6/2012 |
| FR | 2 938 267 | A1 | 5/2010 |
| JP | 04089862 | A * | 3/1992 |
| WO | 200909490 | A1 | 1/2009 |
| WO | 2010052671 | A1 | 5/2010 |

OTHER PUBLICATIONS

International Search Report (PCT/ISA/210) dated Jun. 6, 2014, by the European Patent Office as the International Searching Authority for International Application No. PCT/EP2014/059875.
Written Opinion (PCT/ISA/237) dated Jun. 6, 2014, by the European Patent Office as the International Searching Authority for International Application No. PCT/EP2014/059875.
Notification of Transmittal of Translation of the International Preliminary Report on Patentability (Forms PCT/IB/338 and PCT/IB/373) and the Written Opinion of the International Searching Authority (Form PCT/ISA/237) dated Nov. 26, 2015, by the International Bureau of WIPO in corresponding International Application No. PCT/EP2014/059875. (7 pages).
Jun. 2, 2017 Office Action issued in Chinese Patent Office Application No. 201480034444.5.

* cited by examiner

*Primary Examiner* — Thao T Tran
(74) *Attorney, Agent, or Firm* — Oliff PLC

(57) ABSTRACT

The invention relates to a polyurethane composition comprising one first component and one second component, said first component comprising an alkoxylated aromatic diol, a low molecular aliphatic or cycloaliphatic diol, a specific polybutadiene polyol and a specific polyetherpolyol, in specific ratios. The hardened composition is characterized by having good adhesion characteristics, a resistance which is only slightly dependent on the temperature, in the temperature range of −35 to +85° C. and also very high resistances. It is particularly suitable as a structural adhesive for bonding two substrates.

20 Claims, No Drawings

TWO COMPONENT POLYURETHANE COMPOSITION

TECHNICAL FIELD

The invention relates to the field of two-pack polyurethane compositions and to their use, more particularly as adhesive or as grouting compound.

PRIOR ART

Two-pack polyurethane adhesives based on polyols and polyisocyanates have already long been in use. An advantage of two-pack polyurethane adhesives is that they cure rapidly after mixing and are therefore able after just a short time to accommodate relatively high forces and transmit those forces. For use as structural adhesives, such adhesives are subject to exacting demands in terms of strength and adhesion forces, since adhesives of this kind constitute elements of load-bearing structures.

There is in particular a desire for adhesives which exhibit high strengths and elasticity as structural bonds over an extremely broad temperature range, in conjunction with a minimal dependency of the strength on the temperature. There is additionally a desire for adhesives which display effective adhesion on metallic substrates and can be cured to their ultimate strength both at ambient temperature and in a curing operation accelerated by heat.

DESCRIPTION OF THE INVENTION

It is an object of the present invention, therefore, to provide a two-pack polyurethane composition which possess very high strength, a certain elasticity, and only a low level of dependency of the mechanical properties on the temperature, and which exhibits good adhesion properties on metallic substrates.

This object is surprisingly achieved with the polyurethane composition of the invention. The composition has a high polybutadiene polyol content. It further comprises a polyether polyol, an alkoxylated aromatic diol, and an aliphatic or cycloaliphatic diol of low molecular mass, in specific proportions. The composition possess very high strength and good elasticity, excellent dimensional stability at high temperatures, only a low level of dependency of the mechanical properties on the temperature, and very good adhesion properties on metallic substrates. This is evident in particular from the high values for tensile shear strength in the temperature range from −35 to 85° C. and from the high values for heat distortion temperature (HDT). Moreover, the composition is particularly resistant with respect to moisture.

Further aspects of the invention are subjects of further independent claims. Particularly preferred embodiments of the invention are subjects of the dependent claims.

Embodiments of the Invention

The present invention relates to a polyurethane composition consisting of a first component and a second component; where the first component comprises
at least one alkoxylated aromatic diol A1 having an average molecular weight in the range from 300 to 1000 g/mol,
at least one aliphatic or cycloaliphatic diol A2 having a molecular weight in the range from 90 to 200 g/mol,
at least one polybutadiene polyol A3 having an average OH functionality in the range from 2.1 to 2.9, more particularly 2.3 to 2.7, and having an average molecular weight in the range from 2000 to 4000 g/mol, more particularly 2500 to 3000 g/mol, and
at least one polyether polyol A4 having an OH functionality in the range from 2.2 to 4 and an average molecular weight in the range from 400 to 4000 g/mol; and the second component
comprises at least one polyisocyanate;
the diol A1, the diol A2, the polybutadiene polyol A3, and the polyether polyol A4 being present in an amount such that
the weight ratio A1/A2 is in the range from 0.1 to 1, preferably 0.1 to 0.7, more particularly 0.2 to 0.6,
the weight ratio (A3+A4)/(A1+A2) is in the range from 1.8 to 8, preferably 1.8 to 5.5, especially preferably 1.8 to 5, most preferably 1.8 to 3, and
the fraction of polybutadiene polyol A3, based on all the polyols present in the first component, is in the range from 30 to 80 weight %, preferably 35 to 70 weight %, more particularly 35 to 60 weight %.

The prefix "poly" in designations such as "polyol", "polyisocyanate", "polyether", or "polyamine" indicates in the present document that the substance in question contains, formally, more than one per molecule of the functional groups occurring in its name.

"Molecular weight" is understood in the present document to refer to the molar mass (in grams per mole) of a molecule. The "average molecular weight" denotes the number-average molecular weight $M_n$ of an oligomeric or polymeric mixture of molecules, and is normally determined by GPC against a polystyrene standard.

"Primary hydroxyl group" refers to an OH group which is bonded to a C atom with two hydrogens.

"Open time" in this document refers to the time within which the parts to be bonded must be joined after the components have been mixed.

The term "strength" in the present document refers to the strength of the cured adhesive, strength referring more particularly to the tensile strength and to the modulus of elasticity (elasticity modulus), particularly in the 0.05% to 0.25% elongation range.

"Room temperature" in the present document refers to a temperature of 23° C.

The first component of the composition comprises at least one alkoxylated aromatic diol A1 having an average molecular weight in the range from 300 to 1000 g/mol.

The alkoxylated aromatic diol A1 is more particularly a polyether diol with an aromatic fraction, of the kind obtainable in particular by alkoxylation of an aromatic diol having two phenolic OH groups.

The alkoxylated aromatic diol A1 is preferably an ethoxylated and/or propoxylated and/or butoxylated aromatic diol, more particularly an ethoxylated and/or propoxylated aromatic diol. These diols are particularly readily accessible.

More preferably the alkoxylated aromatic diol A1 is a propoxylated aromatic diol. These diols result in adhesives having good processing properties and having good adhesion properties in the cured state.

The aromatic fraction of the alkoxylated aromatic diol A1 is preferably a benzene radical, naphthalene radical, diphenylmethane radical, 1,1-diphenyl-ethane radical, 2,2-diphenylpropane radical, diphenyl ether radical, benzo-phenone radical, bis(phenyl)sulfone radical, or biphenylyl radical.

Of these, preference is given to the diphenylmethane radical and the 2,2-diphenylpropane radical. These aromatic radicals are derived from bisphenol F and bisphenol A respectively. Alkylated aromatic diols A1 of this kind produce compositions having good processing properties and particularly high strengths, more particularly having high values in tensile strength measurements at temperatures from −35° C. to 85° C.

More preferably the alkoxylated aromatic diol A1 is a propoxylated bisphenol A or a propoxylated bisphenol F, more particularly a propoxylated bisphenol A. Compositions obtained accordingly have particular good adhesion properties, particularly at temperatures of 25° C. to 85° C.

The alkoxylated aromatic diol A1 preferably has an average molecular weight in the range from 350 to 500 g/mol. These diols A1 enable particularly high strengths.

The first component of the composition further comprises at least one aliphatic or cycloaliphatic diol A2 having a molecular weight in the range from 90 to 200 g/mol.

It may be advantageous if the aliphatic or cycloaliphatic diol A2 is not a linear alkylenediol having two primary OH groups, more particularly not 1,4-butanediol or 1,5-pentanediol. Such linear diols are disadvantageous in that compositions having relatively low tensile shear strengths, especially at room temperature and higher temperatures, are obtained.

Preferred as diol A2 are branched alkylenediols, alkylenediols having one primary hydroxyl group and one secondary hydroxyl group, and cycloaliphatic diols.

Preferably the diol A2 is selected from the group consisting of 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol (neopentyl glycol), 1,2-hexanediol, 1,4-butanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, and 1,4-cyclohexanedimethanol.

More preferably the diol A2 is selected from the group consisting of 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol (neopentyl glycol), 1,2-hexanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, and 1,4-cyclohexanedimethanol.

Preferred among these are 1,2-butanediol, 1,3-butanediol, 1,2-pentanediol, 2-methyl-1,4-butanediol, 2,2-dimethyl-1,3-propanediol (neopentyl glycol), 3-methyl-1,5-pentanediol, 1,2-hexanediol, 1,2-octanediol, 3,6-octanediol, and 2-ethyl-1,3-hexanediol.

The most preferred diol A2 is 2-ethyl-1,3-hexanediol. This diol enables compositions which on curing produce particularly high values for the tensile shear strength at high temperatures.

The first component of the composition further comprises at least one polybutadiene polyol A3 having an average OH functionality in the range from 2.1 to 2.9, more particularly 2.3 to 2.7, and an average molecular weight in the range from 2000 to 4000 g/mol, more particularly 2500 to 3000 g/mol.

Polybutadiene polyols of this kind are obtainable in particular through the polymerization of 1,3-butadiene and allyl alcohol in a suitable ratio, or through the oxidation of suitable polybutadienes.

Suitable polybutadiene polyols are, in particular, polybutadiene polyols which include structural elements of the formula (I) and optionally structural elements of the formulae (II) and (Ill).

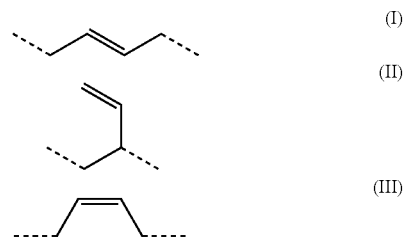

Preferred polybutadiene polyols contain
40% to 80%, more particularly 55% to 65%, of the structural element of the formula (I),
0% to 30%, more particularly 15% to 25%, of the structural element of the formula (II),
0% to 30%, more particularly 15% to 25%, of the structural element of the formula (III).

Particularly suitable polybutadiene polyols are obtainable for example from Cray Valley under the trade name Poly Bd® R-45HTLO or Poly Bd® R-45M.

Polybutadiene polyols of this kind, together with the diols A1 and A2, promote cured compositions of largely temperature-independent strength.

The first component of the composition further comprises at least one polyether polyol A4 having an OH functionality in the range from 2.2 to 4 and an average molecular weight in the range from 400 to 4000 g/mol.

The accompanying use of such polyether polyols A4 enables elastic compositions having particularly high strengths, especially at high temperatures.

Suitable polyether polyols are, in particular, polymerization products of ethylene oxide, 1,2-propylene oxide, 1,2- or 2,3-butylene oxide, oxetane, or tetrahydrofuran, which are prepared using initiating molecules having three or four OH or NH groups. Especially suitable initiating molecules are 1,1,1-trimethylolethane, 1,1,1-trimethylolpropane, glycerol, and ethylenediamine.

A particularly suitable polyether polyol A4 has an OH functionality in the range from 3.1 to 4 and an average molecular weight in the range from 1000 to 4000 g/mol, preferably 2000 to 4000 g/mol, more particularly 3000 to 4000 g/mol. This is, in particular, an ethylenediamine-initiated polyether tetrol having primary or secondary OH groups, more particularly having primary OH groups. A polyether tetrol of this kind enables compositions having very high strengths at high temperatures such as, in particular, 85° C.

Another particularly suitable polyether polyol A4 has an OH functionality in the range from 2.2 to 3 and an average molecular weight in the range from 400 to 3000 g/mol, preferably 400 to 2000 g/mol, more particularly 400 to 1000 g/mol. A polyether triol of this kind enables particularly high strengths at high temperatures such as, in particular, 85° C.

The most preferred polyether polyol A4 is a polyether polyol A4 having an OH functionality in the range from 2.2 to 3 and an average molecular weight in the range from 400 to 1000 g/mol. A polyether triol of this kind enables very particularly high strengths at high temperatures and a particularly high heat distortion temperature on the part of the composition.

The diol A1 and the diol A2 are present in the composition in an amount such that the weight ratio A1/A2 is in the range from 0.1 to 1, preferably 0.1 to 0.7, more particularly 0.2 to 0.6. Within this range the composition has very good adhesion properties in conjunction with high strength.

Moreover, the diol A1, the diol A2, the polybutadiene polyol A3, and the polyether polyol A4 are present in the composition in an amount such that the weight ratio (A3+A4)/(A1+A2) is in the range from 1.8 to 8, preferably 1.8 to 5.5, especially preferably 1.8 to 5, most preferably 1.8 to 3. Within this range the composition has very high strength in conjunction with high elasticity and a high heat distortion temperature.

Moreover, the fraction of polybutadiene polyol A3, based on all polyols present in the first component, is in the range from 30 to 80 weight %, preferably 35 to 70 weight %, more particularly 35 to 60 weight %. This means that the composition includes a high fraction of polybutadiene polyol A3, even if further polyols are present in the first component in addition to the diols A1 and A2 and the polybutadiene polyol A3 and the polyether polyol A4. The high level of polybutadiene polyol A3 ensures the desired temperature-independent mechanical properties and the high resistance to moisture on the part of the composition described.

The polyether polyol A4 is preferably present in the composition, in particular, in an amount such that the weight ratio A4/A3 is in the range from 0.1 to 1, preferably 0.2 to 0.85, more particularly 0.3 to 0.7. A composition of this kind exhibits particularly high strengths at high temperatures.

In one embodiment of the invention, the first component may further comprise a monoalcohol A5 having a molecular weight in the range from 140 to 340 g/mol, this monoalcohol including more particularly at least one ether group, the monoalcohol A5 being present in an amount such that the weight ratio A5/(A1+A2) is in the range from 0.1 to 0.6, preferably 0.1 to 0.4, more particularly 0.15 to 3. The monoalcohol may in particular enhance the processing properties of the composition and the temperature-independent nature of the tensile shear strength.

Especially suitable as monoalcohol A5 are alkoxylated derivatives of phenol, more particularly ethoxylated or propoxylated phenol. A particularly suitable monoalcohol A5 is 1-phenoxy-2-propanol. A monoalcohol of this kind may act particularly effectively to lower the viscosity of the first component, which may be advantageous for the processing properties of the composition, and it may improve the elastic properties at low temperature.

In one embodiment of the invention, the composition is free from monoalcohol A5. This is advantageous in that it results in higher tensile shear strength values at low temperatures and at room temperature being obtained.

The second component of the composition comprises at least one polyisocyanate. Suitable polyisocyanates are, in particular, monomeric di- or triisocyanates, and also oligomers, polymers, and derivatives of the monomeric di- or triisocyanates, and also any desired mixtures thereof.

Suitable aromatic monomeric di- or triisocyanates are, in particular, 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), dianisidine diisocyanate (DADI), 1,3,5-tris(isocyanatomethyl)benzene, tris(4-isocyanatophenyl)methane, and tris(4-isocyanatophenyl) thiophosphate.

Suitable aliphatic monomeric di- or triisocyanates are, in particular, 1,4-tetramethylene diisocyanate, 2-methylpentamethylene 1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and 1,4-diisocyanate, 1-methyl-2,4- and -2,6-diisocyanatocyclohexane and any desired mixtures of these isomers (HTDI or $H_6$TDI), 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer and trimer fatty acid isocyanates such as 3,6-bis(9-isocyanatononyl)-4,5-di(1-heptenyl)cyclohexene (dimeryl diisocyanate), and $\alpha,\alpha,\alpha',\alpha',\alpha'',\alpha''$-hexamethyl-1,3,5-mesitylene triisocyanate.

Preference among these is given to MDI, TDI, HDI, and IPDI.

Suitable oligomers, polymers, and derivatives of the stated monomeric di- and triisocyanates are derived more particularly from MDI, TDI, HDI, and IPDI. Especially suitable among them are commercially available products, more particularly HDI biurets such as Desmodur® N 100 and N 3200 (from Bayer), Tolonate® HDB and HDB-LV (from Rhodia), and Duranate® 24A-100 (from Asahi Kasei); HDI isocyanurates, such as Desmodur® N 3300, N 3600, and N 3790 BA (all from Bayer), Tolonate® HDT, HDT-LV, and HDT-LV2 (from Rhodia), Duranate® TPA-100 and THA-100 (from Asahi Kasei), and Coronate® HX (from Nippon Polyurethane); HDI uretdiones such as Desmodur® N 3400 (from Bayer); HDI iminooxadiazinediones such as Desmodur® XP 2410 (from Bayer); HDI allophanates such as Desmodur® VP LS 2102 (from Bayer); IPDI isocyanurates, such as, for example, in solution as Desmodur® Z 4470 (from Bayer) or in solid form as Vestanat® T1890/100 (from Degussa); TDI oligomers such as Desmodur® IL (from Bayer); and mixed isocyanurates based on TDI/HDI, in the form for example of Desmodur® HL (from Bayer). Also especially suitable are room-temperature-liquid forms of MDI (known as "modified MDI"), which represent mixtures of MDI with MDI derivatives, such as, in particular, MDI carbodiimides or MDI uretonimines or MDI urethanes, known under trade names such as Desmodur® CD, Desmodur® PF, Desmodur® PC (all from Bayer) or Isonate® M 143 (from Dow), and also mixtures of MDI and MDI homologs (polymeric MDI or PMDI), available under trade names such as Desmodur® VL, Desmodur® VL50, Desmodur® VL R10, Desmodur® VL R20, Desmodur® VH 20 N, and Desmodur® VKS 20F (all from Bayer), Isonate® M 309, Voranate® M 229, and Voranate® M 580 (all from Dow), or Lupranat® M 10 R (from BASF). The aforesaid oligomeric polyisocyanates typically in practice represent mixtures of substances having different degrees of oligomerization and/or chemical structures. They preferably have an average NCO functionality of 2.1 to 4.0.

The polyisocyanate is preferably selected from the group consisting of MDI, TDI, HDI, and IPDI and oligomers, polymers, and derivatives of the stated isocyanates, and also mixtures thereof.

The polyisocyanate preferably comprises isocyanurate, iminooxa-diazindione, uretdione, biuret, allophanate, carbodiimide, uretonimine, or oxadiazinetrione groups.

Particularly preferred as polyisocyanate are room-temperature-liquid forms of MDI. These are, in particular, that known as polymeric MDI and also MDI with fractions of oligomers or derivatives thereof. The amount of MDI (i.e., of 4,4'-, 2,4'-, or 2,2'-diphenylmethane diisocyanate and any desired mixtures of these isomers) in such liquid forms of MDI is more particularly 50 to 95 weight %, more particularly 60 to 90 weight %.

Especially preferred as polyisocyanate are polymeric MDI and room-temperature-liquid MDI products which include fractions of MDI carbodiimides or adducts thereof.

With these polyisocyanates, particularly good processing properties and particularly high strengths are obtained.

The polyisocyanate of the second component may include fractions of polyurethane polymers containing isocyanate groups. Either the second component may comprise a separately prepared polyurethane polymer containing isocyanate groups, or the polyisocyanate has been mixed with at least one polyol, more particularly with a polyether polyol, the isocyanate groups being present in a high stoichiometric excess over the OH groups.

The second component preferably comprises only a small fraction of polyurethane polymers containing isocyanate groups, preferably not more than 30 weight %, more preferably not more than 20 weight %, more particularly not more than 10 weight %, based on the sum of polyisocyanate and polyurethane polymers containing isocyanate groups.

Most preferably the second component contains no polyurethane polymer containing isocyanate groups. A second component of this kind is of particularly low viscosity, enabling good processing properties on the part of the composition, and it enables compositions having particularly high strengths.

The polyurethane composition may further comprise, as a constituent of the first component, further substances reactive with isocyanate groups.

The first component preferably contains no polyester polyols. Fractions of polyester polyols typically result in severe embrittlement of the cured composition at low temperature, something which is highly undesirable for its use as a structural adhesive with very largely temperature-independent mechanical characteristics in the temperature range from −35 to 85° C.

With further preference, the first component contains no castor oil-based polyols. Such polyols reduce the tensile strength of the composition to an unwanted extent.

With particular preference the first component is free from polyester polyols and from castor oil-based polyols.

The polyurethane composition may further comprise catalysts which accelerate the reaction of hydroxyl groups with isocyanate groups, more particularly organotin, organozinc, organozirconium, and organobismuth metal catalysts, as for example dibutyltin dilaurate, or tertiary amines, amidines, or guanidines, as for example 1,4-diazabicyclo[2.2.2]octane (DABCO) or 1,8-diazabicyclo[5.4.0]undec-7-ene (DBU). In order to achieve heat activation it is possible in particular for the tertiary amines, amidines, or guanidines to form, reversibly, a salt or a complex with phenol or carboxylic acids, more particularly with phenolic or other aromatic carboxylic acids, with said salt or complex decomposing when the temperature is raised.

Besides those already mentioned, the polyurethane composition may comprise further constituents, of the kind familiar to a person skilled in the art from two-component polyurethane chemistry. These constituents may be present in only one component or in both.

Preferred further constituents are organic and inorganic fillers, such as, in particular, natural, ground, or precipitated calcium carbonates, optionally coated with fatty acids, more particularly stearic acid, and baryte (heavy spar), talcs, finely ground quartzes, silica sand, dolomites, wollastonites, kaolins, calcined kaolins, mica (potassium aluminum silicate), molecular sieves, aluminum oxides, aluminum hydroxides, magnesium hydroxide, silicas, including finely divided silicas from pyrolysis operations, industrially manufactured carbon blacks, graphite, metal powders such as aluminum, copper, iron, silver, or steel, PVC powders, or hollow beads.

The addition of fillers is advantageous in that it raises the strength of the cured polyurethane composition.

The polyurethane composition preferably comprises at least one filler selected from the group consisting of calcium carbonate, kaolin, baryte, talc, finely ground quartz, dolomite, wollastonite, kaolin, calcined kaolin, and mica.

Further constituents present may also in particular be solvents, plasticizers and/or extenders, pigments, rheological modifiers such as, in particular, amorphous silicas, drying agents such as, in particular, zeolites, adhesion promoters such as, in particular, trialkoxysilanes, stabilizers to counter oxidation, heat, light radiation and UV radiation, flame retardants, and surface-active substances, especially wetting agents and defoamers.

A preferred polyurethane composition comprises a first component which comprises
- 30 to 90 weight %, preferably 40 to 80 weight %, more particularly 50 to 80 weight %, of the sum of diol A1, diol A2, polybutadiene polyol A3, and polyether polyol A4, and
- 10 to 70 weight %, preferably 20 to 50 weight %, more particularly 20 to 40 weight %, of fillers,
- and also, optionally, further constituents.

A preferred polyurethane composition comprises a second component which comprises 90 to 100 weight %, more particularly 95 to 100 weight %, of a room-temperature-liquid form of MDI.

The first component and the second component are advantageously formulated such that their mixing ratio in parts by weight lies in the range from 10:1 to 1:1, more particularly 7.5:1 to 2:1.

The mixing ratio between the two components is preferably such that in the mixed polyurethane composition, the ratio between the number of isocyanate groups and the number of isocyanate-reactive groups prior to curing is approximately in the range from 1.2 to 1, preferably 1.15 to 1.05.

The two components are prepared separately from one another and, for the second component at least, preferably in the absence of moisture. Both components are typically each stored in a separate vessel. The further constituents of the polyurethane composition may be present as a constituent of the first or of the second component, with further constituents that are reactive toward isocyanate groups preferably being a constituent of the first component. A suitable vessel for storing the respective component is, in particular, a drum, a hobbock, a pouch, a pail, a cannister, a cartridge, or a tube. The components are both storage-stable, meaning that prior to their use, they can be kept for a number of months up to a year or longer without any change in their respective properties to a degree that is relevant for their service.

Before the composition is mixed, the two components are stored separately from one another and are mixed with one another only at or immediately before use. Advantageously they are present in a pack which consists of two chambers separated from one another.

In a further aspect, the invention encompasses a packaging form consisting of a pack having two chambers separate from one another, each chamber comprising the first component and, respectively, the second component of the composition.

Mixing is accomplished typically using static mixers or by means of dynamic mixers. At the mixing stage, care should be taken to ensure that the two components are mixed very homogeneously. If the two components are incompletely mixed, there are local deviations from the advantageous mixing ratio, and this may be manifested in a deterioration in the mechanical properties.

On contact of the first component with isocyanate groups of the second component, curing commences through chemical reaction. The reaction here is between the hydroxyl groups present, along with any further substances that are present and are reactive toward isocyanate groups, and isocyanate groups that are present. Excess isocyanate groups react with moisture that is present.

As a result of these reactions, the polyurethane composition cures to form a solid material. This procedure is also referred to as crosslinking.

A further subject of the invention is therefore also a cured polyurethane composition obtained from the curing of the polyurethane composition as described in the present document.

The two-component polyurethane composition described can be used with advantage as a structural adhesive or as grouting compound.

The invention accordingly also relates to a method for adhesively bonding a first substrate to a second substrate, said method comprising the steps of:
  mixing the above-described first and second components,
  applying the mixed polyurethane composition to at least one of the substrate surfaces to be bonded,
  joining the substrates to be bonded, within the open time,
  curing the polyurethane composition.

The two substrates here may consist of the same or different materials.

The invention therefore also relates, moreover, to a method for filling joints and gaps between two substrates, said method comprising the steps of:
  mixing the above-described first and second components,
  applying the mixed polyurethane composition into the joint or the gap,
  curing the polyurethane composition.

In these methods for adhesive bonding or for filling of joints and gaps, suitable substrates are, in particular,
  glass, glass-ceramic, glass mineral fiber mats;
  metals and alloys, such as aluminum, iron, steel, and nonferrous metals, and also surface-finished metals and alloys, such as galvanized or chromate metals;
  coated and painted substrates, such as powder-coated metals or alloys and painted metal sheets;
  plastics, such as polyvinyl chloride (rigid and plasticized PVC), acrylonitrile-butadiene-styrene copolymers (ABS), polycarbonate (PC), polyamide (PA), poly(methyl methacrylate) (PMMA), polyesters, epoxy resins, especially epoxy-based thermosets, polyurethanes (PU), polyoxymethylene (POM), polyolefins (PO), polyethylene (PE) or polypropylene (PP), ethylene/propylene copolymers (EPM) and ethylene/propylene/diene terpolymers (EPDM), it being possible for the plastics to have been surface-treated preferably by means of plasma, corona, or flaming;
  fiber-reinforced plastics, such as carbon fiber-reinforced plastics (CRP), glass fiber-reinforced plastics (GRP), and sheet molding compounds (SMC);
  wood, woodbase materials bound for example with phenolic, melamine, or epoxy resins, resin-textile composites, and other so-called polymer composites; and also
  concrete, mortar, brick, plaster, and natural stones such as granite, limestone and sandstone, or marble.

In these methods, one or both substrates are preferably a metal or a glass-ceramic or a glass or a glass fiber-reinforced plastic or a carbon fiber-reinforced plastic, or an epoxy-based thermoset.

As and when necessary, the substrates may be pretreated before the composition is applied. Such pretreatments include, in particular, physical and/or chemical cleaning processes, and also the application of an adhesion promoter, of an adhesion promoter solution, or of a primer.

The adhesive bonding method described produces an article wherein the composition joins two substrates to one another.

This article is more particularly a sandwich element of a lightweight construction, an edifice, as for example a bridge, an industrial product or a consumer product, more particularly a window, a wind turbine rotor blade, or a means of transport, more particularly a vehicle, preferably an automobile, a bus, a truck, a rail vehicle, or a ship, and also an aircraft or a helicopter; or a component for installation in or on such an article.

The polyurethane composition described is notable for high strength and elasticity, these qualities being highly constant over a wide temperature range of −35 to 85° C., and possess good, largely temperature-independent, adhesion properties on metallic substrates. On the basis of these properties, it is especially suitable as a structural adhesive for adhesive bonds which undergo outdoor exposure at ambient temperatures.

A further subject of the invention is therefore also the use of the polyurethane composition described as a structural adhesive for adhesively bonding two substrates.

As a result of the high fraction of polybutadiene polyol A3, the cured composition is very hydrophobic and water-repellent. This may promote a high level of water vapor diffusion resistance on the part of the material. As a consequence of this, the composition is especially suitable also for adhesive bonds where components sensitive to water vapor, such as electronic components, for example, are to be sealed off adhesively.

A further possible advantageous use of the polyurethane composition described is as a grouting compound, more particularly as a grouting compound for filling gaps and joins, for repair purposes, as a ballast compound, or for protection of electronic components.

The polyurethane composition is further used preferably as an encapsulating compound, more particularly as electrical encapsulating compound. In a further aspect, therefore, the invention encompasses the use of a two-pack polyurethane composition as an encapsulating compound, more particularly as electrical encapsulating compound.

Typical examples of applications of the polyurethane compositions of the invention are found in the field of electrical encapsulating compounds.

In a further aspect, therefore, the invention encompasses a method for filling of joints and gaps in a substrate, comprising the steps of
  a) mixing the first component and the second component of a two-pack polyurethane composition as described above,
  b) applying the mixed polyurethane composition into the joint to be bridged between two substrates or into the gap to be filled on the surface of a substrate, c) curing the polyurethane composition in the joint or in the gap.

Particularly suitable substrates are metal, plastic, wood, glass, ceramic, and fiber-reinforced plastics, especially metal and fiber-reinforced plastics.

In a further aspect, therefore, the invention also encompasses a filled article filled in accordance with the method described above.

EXAMPLES

Substances Used

| | |
|---|---|
| BPIP | Propoxylated bisphenol A, average molecular weight about 400 g/mol, OH number 280 mg KOH/g (Simulsol ™ BPIP/P from Seppic) |
| Ethyl-hexane-diol | 2-Ethyl-1,3-hexanediol |
| Poly bd R45 | Polybutadiene polyol with primary OH groups, OH functionality 2.4-2.6, average molecular weight about 2800 g/mol, OH number 47.1 mg KOH/g (Poly bd ® R-45HTLO from Cray Valley) |
| Tetrol | Polyether polyol, alkoxylated aliphatic amine with primary OH groups, OH functionality about 4, average molecular weight about 3700 g/mol, OH number 60 mg KOH/g (Lupranol ® 1002/1 from BASF) |
| Triol | Trifunctional polyether polyol based on glycerol and with secondary hydroxyl groups, average molecular weight about 420 g/mol, OH number 400 mg KOH/g (Lupranol ® 3300 from BASF) |
| Mono-alcohol | 1-Phenoxypropan-2-ol |
| Poly bd R20 | Polybutadiene polyol with primary OH groups, OH functionality 2.4-2.6, average molecular weight about 1300 g/mol, OH number about 101 mg KOH/g (Poly bd ® R20LM from Cray Valley) |
| Krasol | Polybutadiene diol, OH functionality about 1.9, average molecular weight about 3000 g/mol, OH number about 36 mg KOH/g (Krasol ® LBH P-3000 from Cray Valley) |
| Polycin | Castor oil-based polyol, OH functionality 2.2, average molecular weight 2610 g/mol, OH number 52 mg KOH/g (Polycin ® GR-50 from Vertellus) |
| Diol-1 | Polypropylene glycol diol, average molecular weight about 400 g/mol, OH number about 260 mg KOH/g, (Voranol ® P 400 from Dow) |
| Diol-2 | EO-endcapped polypropylene glycol diol, average molecular weight about 4000 g/mol, OH number about 27.5 mg KOH/g, (Voranol ® EP 1900 from Dow) |
| Filler | Mineral filler (Sillitin Z 86 from Hoffmann Mineral) |
| Additives | Stabilizers against oxidation and UV light, and dibutyltin dilaurate catalyst |
| Polyiso-cyanate | Modified diphenylmethane diisocyanate containing MDI carbodiimide adducts, liquid at room temperature, NCO content 29.4 weight % (Isonate ® M 143 from Dow) |

Production of Polyurethane Compositions

For each composition, the ingredients specified in tables 1, 3 and 5, in the amounts indicated (in parts by weight) of the first component-1, were processed to a homogeneous paste in the absence of moisture, using a vacuum dissolver, and stored. Similarly, the ingredients of the second component-2, specified in tables 1, 3 and 5, were processed and stored. The two components were subsequently processed to a homogeneous paste using a SpeedMixer® (DAC 150 FV, Hauschild) for 30 seconds, and this paste was immediately tested as follows:

For the determination of the mechanical properties, the adhesive was brought into dumbbell form as per ISO 527, part 2, 1B, and stored and cured at 23° C. for 24 hours and then at 80° C. for 3 hours. After a conditioning time of 24 hours at the temperature specified in tables 2, 4 and 6 (−35° C. or 23° C. or 85° C.), the modulus of elasticity in the range from 0.05% to 0.25% elongation (E modulus), the tensile strength, and the elongation at break of the specimens thus produced were measured in accordance with ISO 527 on a Zwick Z020 tensile testing machine, at the temperature specified in each case in the tables and at a testing speed of 50 mm/min.

For the measurement of the tensile shear strength, different test specimens were produced, with the adhesive being applied in each case 1 minute after the end of the mixing time, between two steel sheets, degreased using heptanes and coated with cathodic electrocoat, the adhesive being applied in a layer thickness of 2 mm over an overlapping bond area of 15×45 mm. The test specimens were stored and cured at 23° C. for 24 hours and then at 80° C. for 3 hours. After a conditioning time of 24 hours at the temperature specified in tables 2, 4 and 6 (−35° C. or 23° C. or 85° C.), the tensile shear strength was determined according to DIN EN 1465.

The Tg values (glass transition points) were determined on the basis of DMTA measurements on samples in disk format (thickness 2-3 mm, diameter 10 mm), which had been cured under standard conditions (23° C., 50% relative humidity) for 7 days, the determination taking place using a Mettler DMA/SDTA 861e instrument. The measuring conditions were as follows: measurement in shear, 10 Hz excitation frequency, and heating rate of 5 K/min. The samples were cooled to −60° C. and heated to 200° C., accompanied by determination of the complex shear modulus G*[MPa], with a maximum in the plot for the loss angle "tan δ" being read off as the Tg value.

The Martens test for dimensional stability under heating, abbreviated to HDT (for "heat distortion temperature"), was carried out in accordance with DIN EN ISO 75-1 and -2 on samples with dimensions of 10×64×4 mm (+/−0.2 mm) with a flexural stress of 1.8 MPa.

The results are reported in tables 2, 4 and 6.

The data (A3+A4)/(A1+A2), A1/A2, A4/A3, and A5/(A1+A2) in tables 1 and 3 relate to the weight ratios of the diols A1 and A2, polybutadiene polyol A3, polyether polyols A4, and monoalcohol A5 present in the respective composition. The datum "% A3 among polyols" in tables 1, 3 and 5 relates to the fraction of polybutadiene polyol A3 relative to all of the polyols present in the first component, in weight %.

Z-1 to Z-13 are inventive examples. Ref-1 to Ref-13 are comparative examples.

TABLE 1

| | Examples | | | | | | | | | |
|---|---|---|---|---|---|---|---|---|---|---|
| | Z-1 | Z-2 | Z-3 | Z-4 | Z-5 | Z-6 | Z-7 | Z-8 | Z-9 | Z-10 |
| Component-1: | | | | | | | | | | |
| BPIP | 2.0 | 3.1 | 3.0 | 3.1 | 3.1 | 3.0 | 2.9 | 4.0 | 4.0 | 2.9 |
| Ethylhexanediol | 3.4 | 12.4 | 12.0 | 12.4 | 9.4 | 9.1 | 14.0 | 18.0 | 18.0 | 14.0 |
| Poly bd R45 | 30.0 | 38.1 | 37.0 | 38.1 | 40.3 | 39.1 | 32.0 | 27.0 | 27.0 | 32.0 |
| Tetrol | 9.6 | 14.7 | 14.7 | — | — | — | — | — | — | — |
| Triol | — | — | — | 15.2 | 16.0 | 15.5 | 16.5 | 18.0 | 18.0 | 16.5 |

TABLE 1-continued

|  | Examples | | | | | | | | | |
|---|---|---|---|---|---|---|---|---|---|---|
|  | Z-1 | Z-2 | Z-3 | Z-4 | Z-5 | Z-6 | Z-7 | Z-8 | Z-9 | Z-10 |
| Monoalcohol | — | — | 2.9 | — | — | 2.9 | — | — | 2.9 | 2.9 |
| Filler | 54.1 | 32.1 | 29.0 | 30.8 | 30.8 | 29.9 | 33.8 | 32.2 | 29.3 | 28.0 |
| Additives | 0.9 | 0.5 | 0.5 | 0.5 | 0.5 | 0.5 | 0.8 | 0.8 | 0.8 | 0.8 |
| (A3 + A4)/(A1 + A2) | 7.3 | 3.4 | 3.4 | 3.4 | 4.5 | 4.5 | 2.9 | 2.9 | 2.0 | 2.0 |
| A1/A2 | 0.59 | 0.25 | 0.25 | 0.25 | 0.33 | 0.33 | 0.21 | 0.21 | 0.22 | 0.22 |
| A4/A3 | 0.32 | 0.39 | 0.40 | 0.40 | 0.40 | 0.40 | 0.52 | 0.52 | 0.67 | 0.67 |
| % A3 among polyols | 67% | 56% | 55% | 55% | 59% | 59% | 49% | 49% | 40% | 40% |
| A5/(A1 + A2) | — | — | 0.19 | — | — | 0.24 | — | — | 0.13 | 0.17 |
| Component-2: | | | | | | | | | | |
| Polyisocyanate | 14.0 | 37.0 | 40.0 | 51.0 | 46.0 | 49.0 | 53.0 | 62.0 | 65.0 | 56.0 |

TABLE 2

|  | Examples | | | | | | | | | |
|---|---|---|---|---|---|---|---|---|---|---|
|  | Z-1 | Z-2 | Z-3 | Z-4 | Z-5 | Z-6 | Z-7 | Z-8 | Z-9 | Z-10 |
| Tensile shear strength [MPa] | | | | | | | | | | |
| −35° C. | 12.7 | 12.5 | 10.8 | 11.2 | 12.4 | 11.0 | 11.0 | 11.8 | 8.7 | 10.1 |
| 23° C. | 8.7 | 9.9 | 11.4 | 9.4 | 10.4 | 10.5 | 10.7 | 9.5 | 9.2 | 7.5 |
| 85° C. | 3.8 | 3.0 | 2.8 | 4.1 | 5.8 | 5.2 | 6.7 | 4.7 | 6.0 | 7.5 |
| Tensile strength [MPa] | | | | | | | | | | |
| −35° C. | 28.2 | 37.6 | 37.0 | 43.6 | 12.2 | 12.2 | 18.3 | 12.6 | 11.8 | 27.6 |
| 23° C. | 10.8 | 16.4 | 15.3 | 24.6 | 21.2 | 18.4 | 27.4 | 27.1 | 27.0 | 32.0 |
| 85° C. | 4.5 | 4.0 | 3.6 | 9.4 | 7.3 | 7.3 | 11.0 | 9.5 | 8.6 | 11.7 |
| Elongation at break [%] | | | | | | | | | | |
| −35° C. | 30 | 25 | 30 | 13 | 8 | 8 | 1 | 1 | 2 | 2 |
| 23° C. | 105 | 110 | 130 | 40 | 50 | 40 | 15 | 10 | 4 | 5 |
| 85° C. | 50 | 120 | 75 | 110 | 110 | 60 | 90 | 115 | 165 | 85 |
| E modulus [MPa] | | | | | | | | | | |
| −35° C. | 1030 | 780 | 785 | 1085 | 665 | 785 | 1880 | 1130 | 1030 | 890 |
| 23° C. | 74 | 99 | 389 | 736 | 1150 | 685 | 1680 | 1290 | 930 | 1780 |
| 85° C. | 13 | 6 | 11 | 34 | 18 | 52 | 55 | 90 | 20 | 300 |
| Tg [° C.] | −65/41/150 | −63/73/149 | 73/148 | −66/104 | −60/81 | −65/93/150 | −65/102/150 | 107 | −65/106/150 | 110 |
| HDT [° C.] | n.d. | n.d. | n.d. | 59 | n.d. | n.d. | 59 | 64 | 61 | 65 |

"n.d." stands for "not determined"

TABLE 3

|  | Examples | | | | | | | | |
|---|---|---|---|---|---|---|---|---|---|
|  | Z-11 | Z-12 | Z-13 | Ref-1 | Ref-2 | Ref-3 | Ref-4 | Ref-5 | Ref-6 |
| Component-1: | | | | | | | | | |
| BPIP | 3.0 | 3.0 | 3.0 | 3.0 | 3.0 | 3.0 | 3.0 | 3.1 | 3.0 |
| Ethylhexanediol | — | — | 12.0 | 12.0 | 9.1 | 9.1 | 9.1 | 5.2 | 9.1 |
| 1,4-Butanediol | 6.7 | 6.7 | — | — | — | — | — | — | — |
| Poly bd R45 | 37.0 | 37.0 | 37.0 | — | — | — | — | 60.6 | 39.1 |
| Poly bd R20 | — | — | — | 37.0 | 39.1 | — | — | — | — |
| Krasol | — | — | — | — | — | 39.1 | — | — | — |
| Polycin | — | — | — | — | — | — | 39.1 | — | — |
| Tetrol | 14.7 | — | — | 14.7 | — | — | — | — | — |
| Triol | — | 14.7 | 14.7 | — | 15.5 | 15.5 | 15.5 | — | — |
| Diol-1 | — | — | — | — | — | — | — | — | 15.5 |
| Diol-2 | — | — | — | — | — | — | — | — | — |
| Monoalcohol | 2.9 | 2.9 | 2.9 | 2.9 | 2.9 | 2.9 | 2.9 | — | 2.9 |
| Filler | 35.2 | 35.2 | 29.9 | 29.9 | 29.9 | 29.9 | 29.9 | 30.6 | 29.9 |
| Additives | 0.5 | 0.5 | 0.5 | 0.5 | 0.5 | 0.5 | 0.5 | 0.5 | 0.5 |
| (A3 + A4)/(A1 + A2) | 5.3 | 5.3 | 3.4 | | | | | | |
| A1/A2 | 0.45 | 0.45 | 0.25 | | | | | | |
| A4/A3 | 0.4 | 0.4 | 0.4 | | | | | | |

TABLE 3-continued

|  | Examples | | | | | | | | |
| --- | --- | --- | --- | --- | --- | --- | --- | --- | --- |
|  | Z-11 | Z-12 | Z-13 | Ref-1 | Ref-2 | Ref-3 | Ref-4 | Ref-5 | Ref-6 |
| % A3 among polyols | 58% | 58% | 53% | | | | | | |
| A5/(A1 + A2) | 0.3 | 0.3 | 0.2 | | | | | | |
| Component-2: | | | | | | | | | |
| Polyisocyanate | 37.0 | 46.0 | 54.0 | 46.0 | 55.0 | 47.0 | 49.0 | 22.0 | 33.0 |

TABLE 4

|  | Examples | | | | | | | | |
| --- | --- | --- | --- | --- | --- | --- | --- | --- | --- |
|  | Z-11 | Z-12 | Z-13 | Ref-1 | Ref-2 | Ref-3 | Ref-4 | Ref-5 | Ref-6 |
| Tensile shear strength [MPa] | | | | | | | | | |
| −35° C. | 12.5 | 11.4 | 11.1 | 7.6 | 9.5 | 11.6 | 5.2 | 14.3 | 3.3 |
| 23° C. | 7.7 | 8.4 | 11.7 | 10.9 | 9.6 | 5.7 | 3.8 | 9.2 | 1.6 |
| 85° C. | 2.4 | 3.8 | 6.1 | 1.8 | 5.0 | 1.2 | 1.1 | 2.1 | 0.1 |
| Tensile strength [MPa] | | | | | | | | | |
| −35° C. | 28.2 | 30.1 | 44.1 | 6.1 | 32.4 | 24.8 | 1.6 | 27.9 | n.d. |
| 23° C. | 10.8 | 17.9 | 25.1 | 23.5 | 30.0 | 16.3 | 13.9 | 10.1 | n.d. |
| 85° C. | 3.8 | 5.5 | 8.9 | 2.8 | 3.1 | 5.7 | 3.1 | 2.6 | n.d. |
| Elongation at break [%] | | | | | | | | | |
| −35° C. | 25 | 15 | 15 | 2 | 3 | 13 | 2 | 175 | n.d. |
| 23° C. | 80 | 30 | 42 | 45 | 30 | 25 | 4 | 220 | n.d. |
| 85° C. | 120 | 100 | 137 | 170 | 90 | 40 | 65 | 135 | n.d. |
| E modulus [MPa] | | | | | | | | | |
| −35° C. | 610 | 1276 | 1204 | 1557 | 556 | 376 | 429 | 137 | n.d. |
| 23° C. | 124 | 490 | 795 | 868 | 1040 | 287 | 634 | 24 | n.d. |
| 85° C. | 16 | 31 | 39 | 3 | 5 | 48 | 11 | 4 | n.d. |
| Tg [° C.] | −63/ 49/153 | −66/ 87/148 | −66/ 100 | 68/ 151 | 75 | n.d. | −22/ 90/150 | −58/ 66 | 54/ 146 |

"n.d." stands for "not determined"

TABLE 5

|  | Examples | | | | | | |
| --- | --- | --- | --- | --- | --- | --- | --- |
|  | Ref-7 | Ref-8 | Ref-9 | Ref-10 | Ref-11 | Ref-12 | Ref-13 |
| Component-1: | | | | | | | |
| BPIP | 3.0 | — | — | 1.0 | 1.0 | — | — |
| Ethylhexanediol | 12.0 | 12.0 | 12.0 | 12.4 | 12.4 | 12.4 | 12.4 |
| 1,4-Butanediol | — | — | — | — | — | — | — |
| Poly bd R45 | 37.0 | 37.0 | 37.0 | 38.1 | 38.1 | 38.1 | 38.1 |
| Poly bd R20 | — | — | — | — | — | — | — |
| Krasol | — | — | — | — | — | — | — |
| Polycin | — | — | — | — | — | — | — |
| Tetrol | — | 14.7 | — | 14.7 | — | 14.7 | — |
| Triol | — | — | 14.7 | — | 15.2 | — | 15.2 |
| Diol-1 | — | — | — | — | — | — | — |
| Diol-2 | 14.7 | — | — | — | — | — | — |
| Monoalcohol | 2.9 | 2.9 | 2.9 | 2.9 | 2.9 | — | — |
| Filler | 29.9 | 32.5 | 32.5 | 30.0 | 29.6 | 34.0 | 33.5 |
| Additives | 0.5 | 0.9 | 0.9 | 0.9 | 0.9 | 0.8 | 0.8 |
| Component-2: | | | | | | | |
| Polyisocyanate | 25.0 | 37 | 51 | 39 | 54 | 35 | 50 |

TABLE 6

| | Examples | | | | | | |
|---|---|---|---|---|---|---|---|
| | Ref-7 | Ref-8 | Ref-9 | Ref-10 | Ref-11 | Ref-12 | Ref-13 |
| Tensile shear strength [MPa] | | | | | | | |
| −35° C. | 9.8 | 10.8 | 13.1 | 9.8 | 11.9 | 12 | n.d |
| 23° C. | 5.7 | 6.4 | 9.5 | 6.4 | 9.7 | 8 | n.d |
| 85° C. | 0.3 | 1 | 1.9 | 1 | 2.2 | 2.7 | n.d |
| Tensile strength [MPa] | | | | | | | |
| −35° C. | 13.1 | 8.2 | 8.9 | 9.2 | 12.1 | 6.5 | 21 |
| 23° C. | 10.5 | 9 | 13.2 | 9.4 | 15.1 | 12.4 | 16.7 |
| 85° C. | 1.3 | 1 | 2.4 | 1.9 | 3.5 | 4.9 | 7.1 |
| Elongation at break [%] | | | | | | | |
| −35° C. | 5 | 0.7 | 0.6 | 0.7 | 1 | 0.3 | 2.3 |
| 23° C. | 80 | 28 | 19 | 38 | 32 | 107 | 26 |
| 85° C. | 420 | 252 | 155 | 188 | 129 | 119 | 105 |
| E modulus [MPa] | | | | | | | |
| −35° C. | 1146 | 1218 | 923 | 963 | 951 | 1640 | 759 |
| 23° C. | 328 | 44 | 33 | 17 | 278 | 19 | 309 |
| 85° C. | 2 | 1 | 7 | 3 | 21 | 9 | 44 |
| Tg [° C.] | −65/ 69/146 | −65/ 77/155 | −65/ 105/155 | −65/ 79/155 | −65/ 100 | −65/ 79/155 | −65/ 105 |

"n.d." stands for "not determined"

The invention claimed is:

1. A polyurethane composition consisting of a first component and a second component; wherein
the first component comprises
at least one alkoxylated aromatic diol A1 having an average molecular weight in the range from 300 to 1000 g/mol,
at least one aliphatic or cycloaliphatic diol A2 having a molecular weight in the range from 90 to 200 g/mol,
at least one polybutadiene polyol A3 having an average OH functionality in the range from 2.1 to 2.9, and having an average molecular weight in the range from 2000 to 4000 g/mol, and
at least one polyether polyol A4 having an OH functionality in the range from 2.2 to 4 and an average molecular weight in the range from 400 to 4000 g/mol; and
the second component
comprises at least one polyisocyanate;
the diol A1, the diol A2, the polybutadiene polyol A3, and the polyether polyol A4 being present in an amount such that
the weight ratio A1/A2 is in the range from 0.1 to 1,
the weight ratio (A3+A4)/(A1+A2) is in the range from 1.8 to 8, and
the fraction of polybutadiene polyol A3, based on all the polyols present in the first component, is in the range from 30 to 80 weight %.

2. The polyurethane composition according to claim 1, characterized in that the alkoxylated aromatic diol A1 is a propoxylated bisphenol A or a propoxylated bisphenol F.

3. The polyurethane composition according to claim 1, characterized in that the aliphatic or cycloaliphatic diol A2 is selected from the group consisting of 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol, 1,2-hexanediol, 1,4-butanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, and 1,4-cyclohexanedimethanol.

4. The polyurethane composition according to claim 1, characterized in that the polyether polyol A4 has an OH functionality in the range from 3.1 to 4 and an average molecular weight in the range from 1000 to 4000 g/mol.

5. The polyurethane composition according to claim 1, characterized in that the polyether polyol A4 has an OH functionality in the range from 2.2 to 3 and an average molecular weight in the range from 400 to 3000 g/mol.

6. The polyurethane composition according to claim 1, characterized in that the polyether polyol A4 is present in an amount such that the weight ratio A4/A3 is in the range from 0.1 to 1.

7. The polyurethane composition according to claim 1, characterized in that the first component further comprises a monoalcohol A5 having a molecular weight in the range from 140 to 340 g/mol, the monoalcohol A5 being present in an amount such that the weight ratio A5/(A1+A2) is in the range from 0.1 to 0.6.

8. The polyurethane composition according to claim 1, characterized in that the polyisocyanate is a room-temperature-liquid form of 4,4'-, 2,4'-, or 2,2'-diphenylmethane diisocyanate and any desired mixtures of these isomers (MDI) in the form of polymeric MDI or MDI with fractions of oligomers or derivatives.

9. The polyurethane composition according to claim 1, characterized in that the second component contains no polyurethane polymer containing isocyanate groups.

10. The polyurethane composition claim 1, characterized in that the first component is free from polyester polyols and from castor oil-based polyols.

11. The polyurethane composition according to claim 1, characterized in that the mixing ratio in parts by weight between the first component and the second component is in the range from 10:1 to 1:1.

12. The polyurethane composition according to claim 1, the at least one polybutadiene polyol A3 of the first component having the average OH functionality in the range from 2.3 to 2.7, and having the average molecular weight in the range from 2500 to 3000 g/mol.

13. The polyurethane composition according to claim 1, wherein the weight ratio A1/A2 of the second component is in the range from 0.1 to 0.7.

14. The polyurethane composition according to claim 1, wherein the weight ratio (A3+A4)/(A1+A2) of the second component is in the range from 1.8 to 5.5.

15. The polyurethane composition according to claim 1, characterized in that the polyether polyol A4 is present in an amount such that the weight ratio A4/A3 is in the range from 0.3 to 0.7.

16. The polyurethane composition according to claim 1, characterized in that the first component further comprises a monoalcohol A5 having a molecular weight in the range from 140 to 340 g/mol, the monoalcohol A5 being present in an amount such that the weight ratio A5/(A1+A2) is in the range from 0.1 to 0.4.

17. The polyurethane composition according to claim 1, characterized in that the mixing ratio in parts by weight between the first component and the second component is in the range from 7.5:1 to 2:1.

18. A method for adhesively bonding a first substrate to a second substrate, comprising the steps of mixing the first and second components of a polyurethane composition according to claim 1, applying the mixed polyurethane composition to at least one of the substrate surfaces to be bonded, joining the substrates to be bonded, within the open time, curing the polyurethane composition.

19. An article resulting from the method for adhesive bonding according to claim 18.

20. A method for filling joints and gaps in a substrate, comprising the steps of a) mixing the first component and the second component of a polyurethane composition according to claim 1, b) applying the mixed polyurethane composition into the joint to be bridged between two substrates or into the gap to be filled on the surface of a substrate, c) curing the polyurethane composition in the joint or in the gap.

* * * * *